(12) United States Patent
Quaderer et al.

(10) Patent No.: US 8,790,058 B2
(45) Date of Patent: Jul. 29, 2014

(54) PUSH-PIN CAVITY SEALER

(75) Inventors: Dean Quaderer, Livonia, MI (US); Eric N. White, Wales Township, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/586,243

(22) Filed: Aug. 15, 2012

(65) Prior Publication Data

US 2013/0209197 A1 Aug. 15, 2013

Related U.S. Application Data

(60) Provisional application No. 61/523,623, filed on Aug. 15, 2011.

(51) Int. Cl.
*F16B 19/00* (2006.01)

(52) U.S. Cl.
USPC ........... 411/510; 411/392; 411/488; 411/508; 411/512; 411/900; 411/907

(58) Field of Classification Search
USPC ............ 411/82.2, 82.3, 339, 369, 371.1, 392, 411/409, 488, 508, 510, 512, 900, 901, 907, 411/909
See application file for complete search history.

(56) References Cited

U.S. PATENT DOCUMENTS

| | | | |
|---|---|---|---|
| 3,740,083 A * | 6/1973 | Zenhausern | .................. 403/243 |
| 5,040,803 A | 8/1991 | Cieslik | |
| 5,575,526 A | 11/1996 | Wycech | |
| 5,755,486 A | 5/1998 | Wycech | |
| 5,766,719 A | 6/1998 | Rimkus | |
| 5,907,891 A * | 6/1999 | Meyer | ............................ 24/453 |
| 5,932,680 A | 8/1999 | Heider | |
| 6,131,897 A | 10/2000 | Barz | |
| 6,405,413 B2 * | 6/2002 | Ichimaru et al. | ................ 24/297 |
| 6,416,267 B1 * | 7/2002 | Nehl | ............................ 411/80.5 |
| 6,705,814 B2 * | 3/2004 | Dobson | ......................... 411/533 |
| 6,719,513 B1 * | 4/2004 | Moutousis et al. | ........... 411/510 |
| 7,125,461 B2 | 10/2006 | Czaplicki | |
| 7,199,165 B2 | 4/2007 | Kassa | |
| 7,313,865 B2 | 1/2008 | Czaplicki | |
| 7,427,181 B2 * | 9/2008 | Denton et al. | ................ 411/383 |
| 8,028,799 B2 | 10/2011 | Hasler | |
| 8,029,222 B2 | 10/2011 | Nitsche | |
| 8,079,442 B2 | 12/2011 | Wojtowicki | |
| 8,087,916 B2 | 1/2012 | Kanie et al. | |
| 8,293,360 B2 | 10/2012 | Cousin et al. | |

(Continued)

FOREIGN PATENT DOCUMENTS

| | | |
|---|---|---|
| DE | 4104818 | 9/1991 |
| DE | 198 35 704 A1 | 2/2000 |

(Continued)

OTHER PUBLICATIONS

International Search Report, PCT/US2012/050901, filing date Aug. 15, 2012.

(Continued)

*Primary Examiner* — Roberta Delisle

(74) *Attorney, Agent, or Firm* — The Dobrusin Law Firm, PC

(57) ABSTRACT

A method for baffling and/or sealing a vehicle structure by providing a unitary structure including a sealing body with an integrated fastener.

20 Claims, 2 Drawing Sheets

(56) References Cited

U.S. PATENT DOCUMENTS

| | | |
|---|---|---|
| 8,388,037 B2 | 3/2013 | LaNore et al. |
| 8,444,214 B2 | 5/2013 | Helferty |
| 8,469,143 B2 | 6/2013 | Prunarety et al. |
| 2004/0011282 A1 | 1/2004 | Myers et al. |
| 2004/0076831 A1 | 4/2004 | Hable |
| 2005/0260399 A1 | 11/2005 | Finerman |
| 2006/0073266 A1 | 4/2006 | Myers et al. |
| 2006/0272884 A1 | 12/2006 | Vilcek |
| 2008/0110694 A1 | 5/2008 | Niezur |
| 2009/0111371 A1 | 4/2009 | Niezur et al. |
| 2010/0180410 A1 | 7/2010 | Kalyanadurga |
| 2010/0320028 A1 | 12/2010 | Wojtowicki |
| 2011/0057392 A1 | 3/2011 | Monnet et al. |
| 2011/0192675 A1 | 8/2011 | Lecroart et al. |
| 2012/0207986 A1 | 8/2012 | Belpaire et al. |
| 2013/0087406 A1 | 4/2013 | Franey |
| 2013/0140731 A1 | 6/2013 | Belpaire |
| 2013/0181470 A1 | 7/2013 | LaNore et al. |

FOREIGN PATENT DOCUMENTS

| | | |
|---|---|---|
| EP | 2176113 B1 | 4/2011 |
| EP | 1534561 B1 | 8/2013 |
| EP | 2262633 B1 | 9/2013 |
| JP | 11-165598 A | 6/1999 |
| JP | 2002-347058 A | 12/2002 |
| JP | 2004-230834 A | 8/2004 |
| JP | 2006-123710 A | 5/2006 |
| WO | 00/43253 A | 7/2000 |
| WO | 00/55444 | 9/2000 |
| WO | 2009/117376 A1 | 9/2009 |
| WO | 2011/134943 A1 | 11/2011 |
| WO | 2011/147872 A1 | 12/2011 |

OTHER PUBLICATIONS

International Search Report for related PCT application: US/2009/037337 Files Mar. 17, 2009; Published as WO 2009/117376 A1 on Sep. 24, 2009. IPRP.

Written Opinion for related PCT Application: US/2009/037337 filed Mar. 17, 2009; Published as WO 2009/117376 A1 on Sep. 24, 2009. IPRP.

International Preliminary report on Patentability for related PCT Application: US/2009/037337 filed Mar. 17, 2009; Published as WO 2009/117376 A1 on Sep. 24, 2009.

PCT Written Opinion of the International Preliminary Examining Authority dated Aug. 30, 2013; Appln. No. PCT/US2012/050901.

PCT International Preliminary Report on Patentability; Appln. No. PCT/US2012/050901, dated Nov. 27, 2013.

* cited by examiner

PUSH-PIN CAVITY SEALER

CLAIM OF PRIORITY

The present application claims the benefit of the priority of U.S. Provisional Application Ser. No. 61/523,623 filed Aug. 15, 2011, the contents of which are incorporated by reference herein.

TECHNICAL FIELD

The present teachings relate generally to a unite baffling and/or, seeing member that includes a sealing body and an integrated fastener.

BACKGROUND

The transportation industry continues to require methods of baffling, reinforcement, and sealing that provide improved functionality while simultaneously providing reduced weight, cost, and installation time. Often, in an effort to reduce weight, expandable materials are utilized. However, separate metal or plastic fasteners are generally utilized in order to attach the expandable materials to a desired location, adding both cost and installation time to the product. The teachings herein provide for a sealing body having an integrated fastener so that no additional fastening means may be required.

SUMMARY OF THE INVENTION

In a first aspect the present teachings contemplate a device comprising a unitary structure including a sealing body and a fastener integrated with the sealing body. The sealing body may include a plurality of surfaces formed from a non-rigid expandable material. The fastener may comprise a rigid material that is dissimilar from any material for forming the sealing body.

The sealing body may be substantially free of any rigid material. Preferably, the sealing body consists essentially of an expandable material. The unitary structure may be formed by an injection molding or extrusion process. The sealing body may extend in a linear direction from a terminating end of a shank portion of the fastener such that the diameter of the sealing body is substantially similar to the diameter of the shank. The expandable material of the sealing body may be a tacky material and may include a removable film layer to allow for handling. The sealing body may be substantially rectangular in shape and may include at least four surfaces.

The fastener may be a free fastener. The fastener may include a cap portion and shank portion such that the diameter of the cap exceeds the diameter of the shank so that the diameter of the cap prevents complete pull-through of the fastener through an opening in a cavity wall. The fastener may include a central portion into which the sealing body extends. The central portion of the fastener may be in direct planar contact with at least two surfaces of the sealing body. At least two surfaces of the sealing body may be substantially free of any contact with the fastener. The fastener may include a central portion along the shank, the central portion including a void for receiving at least a portion of the sealing body. A portion of the sealing body may be located within the void of the central portion so that the sealing body is located adjacent one or more wings located along the shank. The width of the portion of the sealing body located within the void may be less than the width of any portion of the sealing body that is not within the void. An edge of the sealing body may be substantially parallel to the one or more wings of the fastener. The void within the central portion of the fastener may include a bridge portion that contacts a first wall and an opposing second wall of the shank. The bridge portion may be substantially surrounded by the expandable material of the sealing body.

The present teachings further contemplate a method comprising extruding a fastener portion from a rigid material and extruding a sealing body portion from a non-rigid expandable material onto the fastener portion to form a unitary structure. The fastener may include a central portion having a void and the expandable material of the sealing body is received within the void during the extrusion process. The sealing body may be extruded about the fastener so that it extends in a linear direction from a terminating end of a shank portion of the fastener such that the diameter of at least a portion of the sealing body is substantially similar to the diameter of the shank portion.

The teachings herein contemplate a device and method for the baffling and/or sealing of cavities with an expandable sealing body including one or more integrated fasteners. The expandable sealing body and integrated fastener disclosed herein may allow for effective bathing and/or sealing of a cavity with a lightweight structure with no need for additional fastening means. The device disclosed herein may further allow for simplified insertion into cavities where access is minimal, such that the device can be located within the cavity through relatively small openings (e.g., openings having a diameter smaller than that of the fastener).

DETAILED DESCRIPTION

Figure 1:
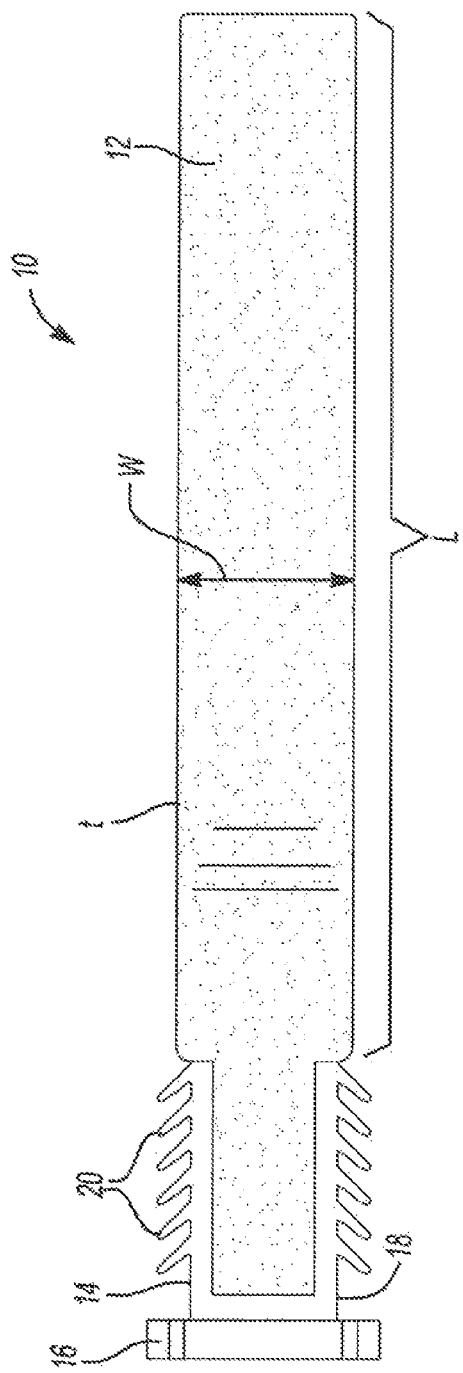
FIG. 1 shows a top-down view of an illustrative example of the sealing body and fastener of the present teachings.

The present teachings allow for improved baffling and sealing of a cavity with a lightweight sealing body and integrated fastener. The unitary structure disclosed herein may include an expandable sealing body and integrated fastener. The integrated fastener may be comprised of a rigid material that is dissimilar to that of the sealing of the sealing body. The sealing body may comprise or may consist essentially of a non-rigid expandable material. The sealing body and integrated fastener may be injection molded or extruded to form a unitary device. The sealing body and integrated fastener may be co-injection molded or co-extruded to form a unitary device.

The sealing body may be substantially free of any rigid material. Preferably the sealing body consists essentially of an expandable material. The sealing body may be formed so that a portion of the sealing body lies in direct planar contact with a portion of the fastener. The sealing body may form a mechanical connection with the fastener. The portion of the sealing body located in contact with the fastener may be adhered to the fastener via an adhesive. The portion of the sealing body located in contact with the fastener may be adhered to the fastener by a tacky nature of the expandable material that forms the sealing body. The sealing body and fastener may be adhered to one another during an extrusion process. The sealing body and fastener may be adhered to one another during an injection molding process. The connection between the sealing body and fastener may be of sufficient strength so that when the fastener is located into an opening in a cavity wall, the sealing body and fastener remain connected at least until the expandable material undergoes expansion.

The sealing body may extend in a substantially linear direction from a terminating end of a shank portion of the fastener such that the diameter of the sealing body is substantially similar to the diameter of the shank. Alternatively, the sealing body may take on any shape or extend in any direction that avoids disengagement from the fastener prior to expansion and does not cover openings in the cavity wall Of prevent the cavity wall from receiving necessary coatings prior to expansion. However, the selection of the shape and size of the sealing body may be such that the sealing body can be located into a cavity through an opening in the cavity that receives the fastener. In other words, the sealing device as described herein is particularly useful when access to a cavity is permitted only through an opening in the cavity wall that is smaller than the maximum width of the fastener (e.g., the largest width of the fastener which may be at the cap portion of the fastener).

The sealing body may be substantially rectangular in shape and may include at least four surfaces. The length of the sealing body may be at least two times, at least 4 times, or event at least 10 times the width of the sealing body. The width of the sealing body (prior to expansion) may be less than the width of the fastener at its widest point (e.g., the width of the cap portion). The sealing body may be substantially rectangular in shape such that it includes two sets of opposing was and a plurality of substantially perpendicular walls. The sealing body may be of any polygonal shape. The sealing body may have curved walls and/or may be substantially circular in shape.

The expandable material of the sealing body may be a tacky material and may include a removable film layer to allow for handling. The tacky nature of the sealing body may promote adhesion between the sealing body and fastener. Alternatively, the expandable material may be substantially dry to the touch.

The fastener may be a tree fastener. The fastener tray be a push-pin fastener. The fastener may be a trapezoidal push-pin fastener. The fastener may be a fastener as disclosed in U.S. Pat. No. 8,029,222, incorporated by reference herein for all purposes. The fastener may include a cap portion and shank portion such that the diameter of the cap exceeds the diameter of the shank so that the diameter of the cap prevents complete pull-through of the fastener through an opening in a cavity wall. The shank may include a first wall and an opposing second wall. Between the first and second wall, the fastener may include a central portion into which the sealing body extends. The central portion of the fastener may include a void for receiving at least a portion of the sealing body. The central portion of the fastener may be in direct planar contact with at least two surfaces of the sealing body. At least two surfaces of the sealing body may be substantially free of any contact with the fastener. The fastener (e.g., the shank of the fastener) may include one or more wings, one or more of which may engage a cavity wall surrounding an opening in the cavity wall. The wings may be located at evenly spaced about intervals along the shank of the fastener. The wings may be located along one surface of the fastener, along two surfaces of the fastener, or along three or more surfaces of the fastener. A portion of the sealing body may be located within the void of the central portion so that the sealing body is located adjacent one or more wings located along the shank. The width of the portion of the sealing body located within the void may be less than the width of any portion of the sealing body that is not within the void. An edge of the sealing body (which may be a terminating edge) may be substantial parallel to the one or more wings of the fastener.

The void within the central portion of the fastener may include a bridge portion that contacts the first wail and the opposing second wall of the shank. The bridge portion may be substantially surrounded by the expandable material of the sealing body. The bridge portion may be formed of a rigid material. The bridge portion may be integrally formed with the fastener of the same rigid material as the fastener. The bridge portion may act to create a mechanical interlock between the sealing body and fastener and as such may include one or more openings which receives a portion of the expandable material of the sealing body during formation of the device.

The present teachings further contemplate a method comprising extruding fastener portion from a rigid material and extruding a sealing body portion from a non-rigid expendable material onto the fastener portion to form a unitary structure. The fastener may include a central portion having a void and the expandable material of the sealing body is received within the void during the extrusion process. The sealing body may be extruded about the fastener so that it extends in a linear direction from a terminating end of a shank portion of the fastener such that the diameter of at least a portion of the sealing body is substantially similar to the diameter of the shank portion. Alternatively, the method may comprise molding a fastener portion from a rigid material and molding a sealing body portion from a non-rigid expandable material onto the fastener portion to form a unitary structure. The fastener may include a central portion having a void and the expandable material of the sealing body is received within the void during the molding process. The sealing body may be molded about the fastener. The sealing body may be molded about the fastener so that it extends in a linear direction from a terminating end of a shank portion of the fastener such that the diameter of at least a portion of the sealing body is substantially similar to the diameter of the shank portion.

The expandable sealing body and integrated fastener may also include an adhesive layer that comprises an outer surface of the expandable sealing body and integrated fastener. The expandable sealing body and integrated fastener may include a plurality of sides with varying lengths, the lengths of some sides being substantially longer than the lengths of other sides. The sealing body and integrated fastener, the cut-outs, or both may be substantially rectangular in shape.

The materials may also include a film layer, such as that disclosed in U.S. Patent Publication Nos. 2004/0076831 and 2005/0260399, incorporated by reference herein for all purposes. The film layer may be used to cover a material that is tacky to the touch. The film layer may be removed from the material prior to application of the material to a vehicle structure, such that the film will reveal a tacky surface of the material that will adhere to the structure.

The size of the expandable sealing body and integrated fastener may depend upon the size of the opening through which the expandable sealing body and integrated fastener is located. The thickness of the expandable sealing body may be at least about 0.1 mm. The thickness of the expandable sealing body may be less than about 50 mm. The thickness of the expandable sealing body may be from about 0.5 mm to about 20 mm. The thickness of the expandable sealing body may be less than about 10 mm. The thickness of the expandable sealing body may be from about 3 mm to about 8 mm. The length of the expandable sealing body may be any length required to sufficiently fill a cavity. As an example, the length of the expandable sealing body may be at least about 5 mm, at about 20 mm or even at least about 50 mm.

After placement of the expandable sealing body and integrated fastener throng opening (and optionally into a cavity), the expandable material may expand according to a predetermined set of conditions. For example, exposure to certain levels of heat may cause the expandable material to expand. The volumetric expansion of the expandable material may vary depending upon the sealing and/or baffling needs of a particular cavity. The expandable sealing body and integrated fastener may expand at least about 100%. The expandable material may expand less than about 2,000%. The expandable material may expand at least about 500%, at least about 1,000%, or more. The expandable material may expand less than about 1,000% or even less than about 500%.

The expandable sealing body may be generally dry to the touch or tacky and may be shaped in any form of desired pattern, placement, or thickness, but is preferably of substantially uniform thickness. Though other heat-activated materials are possible for the expandable sealing body and integrated fastener, a preferred heat activated material is an expandable polymer or plastic, and preferably one that is formable. The expandable sealing body and integrated fastener may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165, incorporated by reference herein for all purposes. For example, and without limitation, the foam may also be an EVA/rubber based material, including an ethylene copolymer or terpolymer that may sees an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104. The expandable sealing body may be a die cut material, A number of baffling or sealing foams may also be used for the expandable sealing body and integrated fastener. A typical foam includes a polymeric base material, such as one or more ethylene-based polymers which, when compounded with appropriate ingredients (typically a Wowing and curing agent), will expand and cure in a reliable and predictable manner upon the application of heat or the occurrence of a particular condition. From a chemical standpoint for a thermally material, the foam is usually initially processed as a flowable material before curing, and upon curing, the material will typically cross-link making the material incapable of further flow.

The expandable sealing body can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6.131,897, the teachings of which are incorporated herein by reference. Some other possible materials include, but are not limited to, polyolefin materials, copolymers, and terpolymers with at least one monomer type such as an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680 incorporated by reference herein for purposes.

In applications where the expandable sealing body comprises a heat activated material, an important consideration involved with the selection and formulation of the material is the temperature at which a material cures and, if expandable, the temperature of expansion. Typically, the material becomes reactive (cures, expands, or both) at higher processing temperatures, such as those encountered in an automobile assembly plant, when the material is processed along with the automobile structures at elevated temperatures or at higher applied energy levels, e.g., during coating (e.g., e-coat, paint, or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C. to 150° C.), The expandable sealing body and integrated fastener may lie mechanically attached to a cavity wall vie the integrated fastener. The integrated fastener may be shaped as a tree-fastener, an arrow-head fastener, or a threaded fastener. The integrated fastener may also be formed in a variety of shapes and in a variety of configurations so long as it can secure the expandable sealing body to a cavity. The integrated fastener may be formed of a rigid material, which may be a metal or polymeric material. The integrated fastener may be formed of a nylon material. The integrated fastener may be capable of securing multiple layers or types of materials to a structure. The integrated fastener may be capable of receiving an additional fastening means located thereon after the fastener has been located into an opening. The integrated fastener may be shaped as a partial arrowhead fastener. The integrated fastener may have flexible wings such as that disclosed ire U.S. Pat. No. 8,029,222 (incorporated, by reference herein for all purposes), so that it can b located into an opening having a diameter that is smaller than the largest diameter of the fastener.

The expandable sealing body and integrated fastener of the present invention may be installed into an automotive vehicle although it may be employed for other articles of manufacture such as boats, buildings, furniture, storage containers or the like. The expandable sealing body and integrated fastener may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

The materials and formation process of the present invention create a simplified lightweight sealing, reinforcement, and baffling device that can be easily customized to fit any cavity. The integrated fastener may be molded onto the sealing body.

Figure 2:
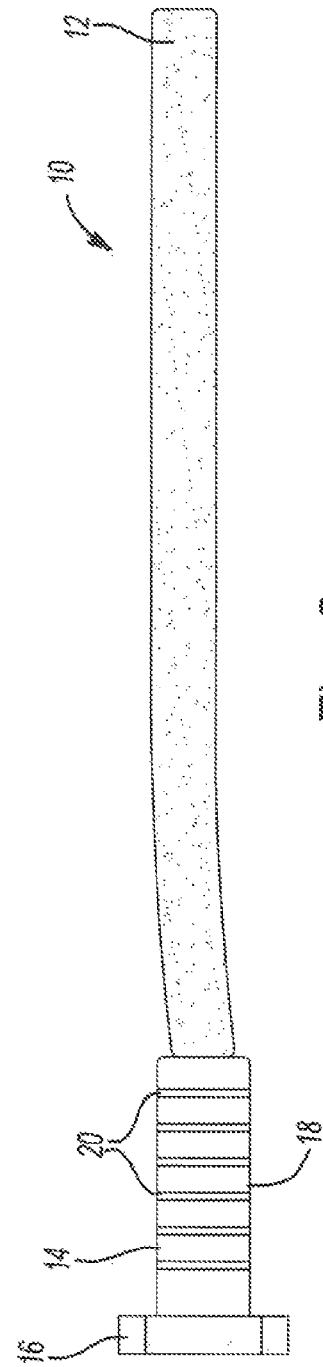
FIG. 2 shows a side profile view of the sealing body and fastener of FIG. 1.

As shown for example in FIGS. 1 and 2, the device (e.g., the unitary structure) 10 may include a sealing body 12 and integrated fastener 14. The integrated fastener 14 may include a cap portion 16 and shank portion 18. The integrated fastener may include a plurality of wings 20. The sealing body has a length (l), a width (w) and a thickness (t).

Figure 3:
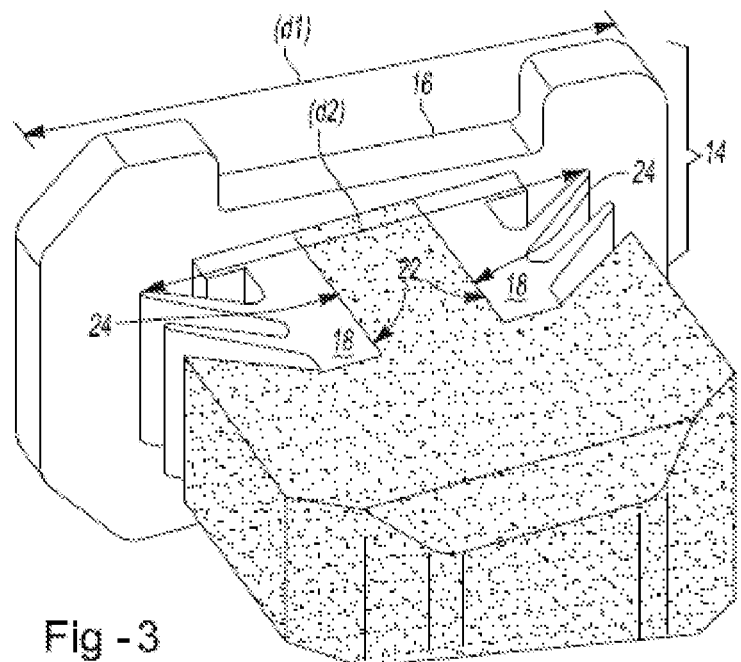
FIG. 3 shows a perspective view of the fastener shown at FIGS. 1 and 2.
Figure 4:
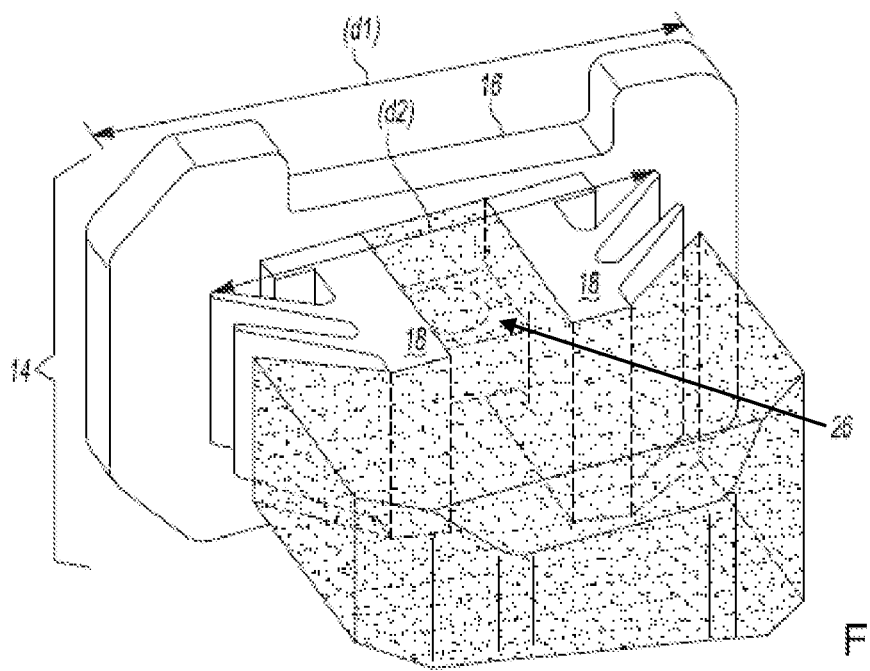
FIG. 4 shows an additional perspective view of the fastener shown at FIGS. 1 and 2, showing internal features of the fastener.

As shown in FIGS. 3 and 4, the integrated fastener 14 may include a cap portion 16 and shank portion 18. The diameter (d1) of the cap portion may be larger than any diameter (d2) of the shank portion. The sealing body 12 may be unitarily formed with the integrated fastener 14 such that a portion of the sealing body 22 lies in direct planar contact with a portion of the integrated fastener. As shown in FIG. 4, the integrated fastener 14 may include a bridge portion 26 that contacts the walls of the shank portion 18.

Any numerical values recited herein include all values from the lower value to the upper value in increments of one unit provided that there is a separation of at least 2 units between any lower value and any higher value. As an example, it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the invention of a range in terms of at "x" parts by weight of the resulting polymeric blend composition "also contemplates a teaching of ranges of same recited amount of "x" in percent by weight of the resulting polymeric blend composition."

Unless otherwise stated, all ranges include both endpoints ant all numbers between the endpoints. The use of "about" or "approximately" in connection with a range applies to both ends of the range. Thus, "about 20 to 30" is intended to cover "about 20 to about 30", inclusive of at feast the specified endpoints.

The disclosures of ell articles and references, including patent applications and publications, are incorporated by reference for all purposes. The term "consisting essentially of" to describe a combination shall include the elements, ingredients, components, or steps identified, and such other elements ingredients, components, or steps that do not materially affect the basic and novel characteristics of the combination. The use of the terms "comprising" or "including" describe combinations of elements, ingredients, components, or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device comprising:
a unitary structure including:
a sealing body comprising a plurality of outer side surfaces and a non-rigid expandable material; and
a fastener integrated with the sealing body and comprising a rigid material that is dissimilar from any material for forming the sealing body, wherein the fastener guides the expansion of a portion of the sealing body adjacent to the fastener.

2. The device of claim 1, wherein the fastener is a tree fastener.

3. The device of claim 1, wherein the sealing body is substantially free of any rigid material.

4. The device of claim 1, wherein the sealing body consists essentially of an expandable material.

5. The device of claim 1, wherein the unitary structure is formed by an injection molding or extrusion process.

6. The device of claim 1, wherein the fastener includes a cap portion and shank portion such that the diameter of the cap exceeds the diameter of the shank so that the diameter of the cap prevents complete pull-through of the fastener through an opening in a cavity wall.

7. The device of claim 1, wherein the sealing body extends in a linear direction from a terminating end of the shank such that the diameter of the sealing body is substantially similar to the diameter of the shank.

8. The device of claim 7, wherein the fastener includes a central portion along the shank, the central portion including a void for receiving at least a portion of the sealing body.

9. The device of claim 8, wherein a portion of the sealing body is located within the void of the central portion so that the sealing body is located adjacent one or more wings located along the shank.

10. The device of claim 9, wherein the width of the portion of the sealing body located within the void is less than the width of any portion of the sealing body that is not within the void.

11. The device of claim 9, wherein an edge of the sealing body is substantially parallel to the one or more wings.

12. The device of claim 8, wherein the void includes a bridge portion that contacts a first wall and an opposing second wall of the shank.

13. The device of claim 12, wherein the bridge portion is substantially surrounded by the expandable material of the sealing body.

14. The device of claim 1, wherein the expandable material of the sealing body is a tacky material and includes a removable film layer to allow for handling.

15. The device of claim 1, wherein the sealing body is substantially rectangular in shape and includes at least four outer side surfaces.

16. The device of claim 1, wherein the fastener includes a central portion into which the sealing body extends.

17. The device of claim 16, wherein the central portion of the fastener is in direct planar contact with at least two surfaces of the sealing body.

18. The device of claim 1, wherein at least two outer side surfaces of the sealing body are substantially free of any contact with the fastener.

19. A method comprising:
- extruding a fastener portion from a rigid material;
- extruding a sealing body portion from a non-rigid expandable material onto the fastener portion to form a unitary structure;
- wherein the fastener includes a central portion having a void and the expandable material of the sealing body is received within the void during the extrusion process.

20. The method of claim 19, wherein the sealing body is extruded about the fastener so that it extends in a linear direction from a terminating end of a shank portion of the fastener such that the diameter of at least a portion of the sealing body is substantially similar to the diameter of the shank portion.

\* \* \* \* \*